United States Patent
Gambaretto

(12) 
(10) Patent No.: US 6,284,715 B1
(45) Date of Patent: Sep. 4, 2001

(54) USE OF FLUORINATED SOLVENTS FOR APPLICATION OF FLUORINATED WAXES ON SKIS

(75) Inventor: Gian Paolo Gambaretto, I-Padova (IT)

(73) Assignee: Centeiro Trading LDA, Funchal (PT)

( * ) Notice: Subject to any disclaimer, the term of this patent is extended or adjusted under 35 U.S.C. 154(b) by 0 days.

(21) Appl. No.: 09/500,795

(22) Filed: Feb. 10, 2000

(30) Foreign Application Priority Data

Feb. 18, 1999 (CH) .................................................... 0307/99

(51) Int. Cl.$^7$ ................................................. C10M 105/52

(52) U.S. Cl. ......................... 508/106; 508/590; 570/136

(58) Field of Search ..................................... 508/590, 106; 570/134, 175, 176, 140, 142, 171, 136; 252/580; 510/180

(56) References Cited

PUBLICATIONS

*Aldrich* Catalog (1992), Title Page, pp. 197, 564, 670, 798 & 1286.
*The Merck Index* (1983), Title Page, pp. 252–253, 373–374, 445, 547, 598, 970, 1306, 1314–1315, 1364 & 1378.

*Primary Examiner*—Yogendra N. Gupta
*Assistant Examiner*—Gregory E. Webb
(74) *Attorney, Agent, or Firm*—Hollander Law Firm, P.L.C.

(57) ABSTRACT

Fluorinated solvents are used for the application of fluorinated waxes to skis without impairing the physico-mechanical characteristics of the ski sole. The fluorinated waxes are applied to skis in the form of a spray or an aerosol allowing for quick and effective application of high melting point fluorinated waxes onto ski soles. The fluorinated solvent may be one or more linear, branched, cross-linked, or cyclic perfluorinated compounds having a boiling temperature ranging between 30° C. and 150° C., and preferably between 50° C. and 100° C. Fluorinated waxes can be dissolved in such solvents, and the mixtures of fluorinated waxes and solvents are stored in spray cans and are sprayed onto the ski soles as aerosols or as sprays.

25 Claims, No Drawings

USE OF FLUORINATED SOLVENTS FOR APPLICATION OF FLUORINATED WAXES ON SKIS

The present invention relates to the use of fluorinated solvents, such as perfluorinated alkyls or perfluorinated alkyl ethers, for the application of fluorinated waxes on skis, snowboards, toboggans, or other items where smooth gliding properties on snow or water is desired.

BACKGROUND OF THE INVENTION

Substrates called "ski waxes" which improve gliding properties of the ski by lowering the friction coefficients between the ski sole and the snow surface are well known in the field of skiing.

As a rule the sole of any ski consists of a very high molecular weight polyethylene and there are several reasons why the ski waxes are applied to the ski sole, namely:

1. To reduce or eliminate surface roughness of the sole and irregularities of the sole in such a manner that the sole is rendered nearly perfectly smooth and even and, therefore, resistance due to mechanical friction of the gliding surface is reduced.

2. To lower the surface tension so that adhesion of the gliding surface to the snow surface is reduced due to the lower interfacial energy of a chemical nature between the two surfaces.

3. To act as an actual lubricant, liquid or solid depending on the types of wax used, between the ski sole and the snow surface.

The first ski waxes used in the field of snow skiing, and the ones used most commonly today, consist of various paraffins. The waxes differ from one another in several ways which include differences in:

Molecular weight distribution curves of their components

Number of branching or cross-link density

Possible oil contents

Degree of crystallization and melting point, which usually depend on the three characteristics listed above.

Since 1985, in addition to paraffin ski waxes described above, fluorinated ski waxes, or so-called "fluorinated waxes," became available. In fluorinated waxes hydrogen atoms of the paraffin are completely substituted with fluorine atoms.

These fluorinated waxes exhibit extremely low surface tension which, in turn, results in a lower coefficient of friction of the ski on the snow.

These waxes, however, have some disadvantages such as high vapor pressure in conjunction with a high melting point and immiscibility with or insolubility in hydrogenated paraffins.

For increasing the range of applicability of these waxes, over the past few years waxes with mixed chains that serve as compatibilizers between the fluorinated and hydrogenated waxes have been developed. These compatibilizing waxes comprise chains that are partially hydrogenated and partially fluorinated. Addition of hydrogenated paraffins to fluorinated waxes improves the characteristics of the fluorinated waxes by lowering their volatility as well as the melting point.

One of the most important characteristics determining the quality of a ski wax is its ability to be applied to a ski sole without impairing the physico-mechanical properties of the sole.

Thus, a hydrogenated paraffin can be effectively applied to a ski sole as long as its melting point is below 105° C. to 110° C.

If, however, the melting temperature of the paraffin is above 118° C. to 120° C., the ski sole the paraffin is applied onto and which absorbs such paraffin may separate from the ski or the surface of the sole may be damaged so as to impair the original characteristics of the sole.

Recently sprayable paraffins or paraffin solutions have been marketed which present several advantages over the conventional paraffins as follows:

a) sprayable paraffin can be distributed more uniformly or evenly over the sole while the amounts of the paraffin being consumed is reduced;

b) paraffins of high molecular weight can be utilized in sprayable paraffin solutions which could not be previously applied in a powder form solely due to its high molecular weight.

These sprayable solutions currently available on the market, however, present the following disadvantages:

a) they contain, in many cases, toxic substances such as chlorinated or aromatic solvents, and, in many cases, are flammable;

b) after application to a ski sole, and after the majority of the solvent has evaporated part of the solvent still remains trapped within the paraffin modifying the characteristics of the latter.

Up to now, no fluorinated wax in sprayable form has been available or disclosed in the literature, because the fluorinated waxes, i.e containing completely fluorinated or perfluoronated chains, are not soluble in any hydrogenated organic solvent.

The present invention provides fluorinated waxes that can be applied as sprays or aerosols and eliminate the above-mentioned disadvantages of the known sprayable solutions containing paraffins or paraffin waxes.

SUMMARY OF THE INVENTION

One or more fluorinated solvents is employed for the application of one or more fluorinated waxes to ski soles or other surfaces for improving the gliding properties of the ski or surface by lowering the coefficient of friction between the surface and the snow surface or water surface. High melting point waxes may be applied by spraying without ruining or impairing the physico-mechanical characteristics of the ski sole or other surface. The one or more fluorinated solvents may be a linear, branched, cross-linked, or cyclic perfluorinated compound having a boiling point from about 30° C. to about 150° C., preferably from about 50° C. to about 100° C. The sprayable composition is a solution or a suspension at room temperature and about atmospheric pressure. The fluorinated wax may be one or more compounds having at least twelve carbon atoms in a chain. The carbon chains may be saturated or unsaturated, perfluorinated, or partially fluorinated. The sprayable compositions may be stored in spray cans or aerosol cans and can be sprayed as a wax in the form of an aerosol or spray onto ski soles, snowboard soles, toboggan soles, and the like.

DESCRIPTION OF THE INVENTION

The present invention provides a sprayable liquid composition or sprayable suspension comprising fluorinated ski waxes and fluorinated solvents. The sprayable compositions may be stored in a spray can or aerosol can for spraying onto the gliding surface of skis, snowboards, toboggans, and other items where smooth gliding properties on snow or water is desired.

Fluorinated waxes suitable for the present invention are perfluorinated compounds containing carbon chains with at least 12 carbon atoms, for example 12 to 20 carbon atoms. The carbon chains can be saturated or unsaturated. The perfluorinated compounds may be completely fluorinated $C_{12}$ and up carbon chains, $R_f$, or may be mixed perfluorinated-hydrogenated chains comprising completely fluorinated block(s) and hydrogenated block(s) such as $R_f$—$R_H$ or $R_f$—$R_H$—$R_f$, wherein $R_f$ is a completely fluorinated carbon chain or group and $R_H$ is a completely hydrogenated carbon chain or group. The chains can be linear or branched. Examples of unsaturated fluorinated waxes which may be utilized are $C_8F_{17}$—$CH_2$—$CH=CH$—$C_8F_{17}$ or $C_6F_{13}$—$CH_2$—$CH_2$—$CH=CF$—$C_5F_{11}$ and mixtures thereof. Examples of compounds which may be employed further include compounds with hydrogenated cores having two or four fluorinated substituents such as

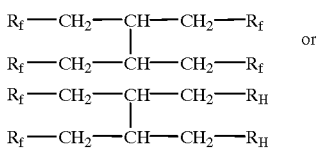

Examples of compounds having a hydrogenated core and two or more perfluorinated chains which may be used in the present invention and disclosed in my copending U.S. patent application, Ser. No. 09/261,131, filed Mar. 3, 1999, for Lubricant for Improved Gliding Properties of Skis and Its Application in Skiing, now U.S. Pat. No. 6,121,212. As disclosed therein, the compound may have four perfluorinated chains attached to a hydrogenated core in such a manner as to form a tetra-substituted derivative according to the formula

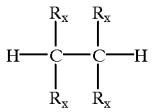

wherein each $R_x$ group can be the same or different and comprises a perfluorinated alkyl group. $R_x$ may be a group selected from $R_f$, $R_f$—$CH_2$—, or $R_f$—$CH_2$—$CH_2$—, wherein $R_f$ is a perfluorinated alkyl group such as a $C_4F_9$, $C_6F_{13}$, $C_8F_{17}$, $C_{10}F_{21}$, $C_{12}F_{25}$, or $C_{14}F_{29}$ group. In embodiments of the invention all four groups designated $R_x$ may be the same, or two of the $R_x$ groups may be different from the other two $R_x$ groups in the number of carbon atoms. Two of the $R_x$ groups may be $R_f$ groups, and two of the $R_x$ groups may be selected from $R_f$—$CH_2$ and $R_f$—$CH_2$—$CH_2$ groups.

The solvents for use in the present invention are one or more fluorinated polar or non-polar solvents such as perfluorinated alkanes or perfluorinated alkyl ethers. The fluorinated solvents can be linear, branched, crosslinked, or cyclic fluorinated compounds with boiling points from about 30° C. to about 150° C., preferably from about 50° C. to about 100°. The perfluorinated solvents may be saturated or unsaturated and the compounds may further contain a nitrogen atom, such as perfluoro-tripropyl-amine or perfluoro-methyl-morpholine. Preferred solvents contain nitrogen and/or oxygen atoms in their molecules. Perfluorinated solvents may be used in combination with non-fluorinated solvents. Examples of other perfluorinated solvents which may be employed are perfluorinated olefins, saturated or unsaturated $R_f$—$R_H$ compounds with low boiling point, such as $CF_3$—$(CF_2)_3$—$(CH_2)_2$—$CH_3$ or $CF_3$—$(CF_2)_5$—$CH_2$—$CH_3$, perfluoro such as perfluoro-cyclohexane, perfluoro-cyclohexene, perfluoro-aromatic compounds such as perfluoro-benzene, and mixtures thereof.

The compositions of the present invention offer several significant advantages compared to sprayable aerosol ski waxes currently available on the market:

1. The liquid compositions of the present invention are nonflammable and virtually non-toxic.

2. The ability of maintaining fluorinated waxes of very high melting point (150° C. to 160° C.) in solution and/or in suspension in such a manner that they can be applied to the ski sole without ruining or impairing the properties of the ski sole is much more important in the field of the waxes than in the field of the paraffins insofar as, at the same melting point, the volatility of the waxes is much higher ($C_{12}H_{25}$: boiling point=216° C., melting point=−10° C.; $C_{12}F_{25}$: boiling point=178° C. melting point=75° C.).

3. The solvents used in the compositions of the present invention are much more volatile than the solvents commonly used in aerosol compositions containing paraffins and, thus, almost immediately after the application of the composition the fluorinated wax dries up and the dry wax contains virtually no entrapped solvent.

4. In cases where trace amounts of the solvent remain trapped in the wax, there is no deterioration of the surface tension properties or surface tension coefficient since the surface tension of the solvents and of the fluorinated waxes are similar.

5. The compositions according to the invention allow for application to a ski sole products of high melting point, and low volatility, which overcomes the main disadvantage of the waxes applied in powder form.

6. The waxes of lower molecular weight (e.g. $C_{12}F_{26}$) behave as co-solvents for the ones of progressively higher molecular weight, which allows for the higher molecular weight waxes to remain in solution, even in cases when the higher molecular weight waxes such as $C_{16}F_{34}$ and $C_{18}F_{38}$ alone would be poorly dissolved by the solvent used to dissolve a mixture of lower and higher molecular weight waxes.

The present invention will be described in more detail in the following illustrative examples where all parts, percentages and ratios are by weight, and all temperatures are in ° C., and all pressures are atmospheric unless otherwise indicated:

EXAMPLE 1

100 g of the wax $C_{12}F_{26}$ with a melting point of 75° C. was dissolved in 400 g of RM 101 (a commercially available solvent produced by MITENI, consisting of a mixture of perfluoro-butyl-tetrahydrofuran and perfluoro-propyl-tetrahydropyran in a 60:40 ratio, and having a boiling point equal to 101° C.) until dissolved completely and then cooled down to 20° C. under agitation.

The resulting solution is a liquid containing no precipitant. It can be stored in spray cans and applied as a spray or aerosol.

EXAMPLE 2

The procedure of Example 1 was followed, except 100 g of the wax $C_{12}F_{26}$ was dissolved in 400 g of Fomblin HT 55° C. (produced by AUSIMONT, a perfluoro ether having the structural formula $CF_3[(O$—$CFCF_3$—$CF_2)_n$—$(O$—$CF_2)_m]$—$O$—$CF_3$, (melting point 55° C.)) until dissolved completely. The solution is then cooled down to 20° C. under agitation.

The resulting solution remains liquid without any precipitant in it. The solution can be stored in spray cans for use as an aerosol.

EXAMPLE 3

80 g of the following product $C_8F_{12}$—$(CH_2)_3$—$C_8F_{17}$ with a melting point of 89° C. to 90° C. and a boiling point of 260° C. was dissolved in 320 g of perfluoroheptane (boiling point=82° C.) until dissolution was complete and then cooled down to 20° C.

The resulting solution remains liquid upon cooling and can be stored in spray cans ready for use as a spray or an aerosol.

EXAMPLE 4

50 g of pure $C_{16}F_{34}$ with a melting point of 125° C. was dissolved in 350 g Fomblin HT55 until dissolved completely and then quenched down to 10° C. Upon quenching, an unstable milky suspension was obtained. The content of the wax remaining dissolved was only 40%.

This suspension can be stored in spray cans and can be sprayed as an aerosol onto a ski sole, but only after vigorous shaking of the suspension.

EXAMPLE 5

50 g of a mixture of fluorinated waxes of the following composition: $C_{12}F_{26}$=22%, $C_{14}F_{30}$=37%, $C_{16}F_{34}$=25%, $C_{18}F_{38}$=12%, and $C_{20}F_{42}$=4%, with a melting inverval of 97° to 98° C. was dissolved in 350 g of Fomblin HT55 until dissolved completely and then was quenched down to 10° C. Upon quenching a stable liquid milky suspension was obtained. The suspension contains less than 10% of the wax that is not dissolved.

As can be seen from the results of Examples 4 and 5, waxes of lower molecular weight (e.g. $C_{12}F_{26}$) serve as co-solvents for the waxes of progressively higher molecular weight such as the $C_{16}F_{34}$ and the $C_{18}F_{38}$ waxes, so that waxes of higher molecular weights remain dissolved in solvents in which they would be soluble only to a small extent in the absence of lower molecular weight waxes.

What is claimed is:

1. A sprayable composition comprising at least one fluorinated solvent and at least one fluorinated wax, wherein said at least one fluorinated solvent comprises at least one perfluorinated compound selected from the group consisting of linear, branched, cross-linked, and cyclic perfluorinated compounds having a boiling point from 30° C. to 150° C.

2. A sprayable composition as claimed in claim 1, wherein said sprayable composition is storable in spray cans and can be sprayed as a wax in the form of an aerosol or spray onto ski or snowboard soles.

3. A sprayable composition as claimed in claim 1, wherein said boiling point of said at least one fluorinated solvent is from 50° C. to 100° C.

4. A sprayable composition as claimed in claim 1, wherein said at least one fluorinated solvent comprises a nitrogen and/or oxygen atom in its molecules.

5. A sprayable composition as claimed in claim 1, wherein said sprayable composition is a solution or a suspension at room temperature.

6. A sprayable composition as claimed in claim 5, wherein said composition is non-toxic and nonflammable.

7. A sprayable composition as claimed in claim 1, wherein said at least one fluorinated wax is selected from perfluorinated compounds represented by the formula I, perfluorinated-hydrogenated mixed chain compounds represented by the formulas II and III, and mixtures thereof $$R_f \qquad (I)$$

$$R_f\text{—}R_H \qquad (II)$$

$$R_f\text{—}R_H\text{—}R_f \qquad (III)$$

wherein $R_f$ is a perfluorinated carbon chain and $R_H$ is a hydrogenated carbon chain.

8. A sprayable composition as claimed in claim 7, wherein said compounds represented by formulas (I), (II), and (III) comprise at least 12 carbon atoms.

9. A sprayable composition as claimed in claim 8, wherein $R_f$ is a perfluorinated alkyl chain.

10. A sprayable composition as claimed in claim 8, wherein $R_H$ is a hydrogenated alkyl chain.

11. A sprayable composition as claimed in claim 8, wherein $R_H$ or $R_f$ is an unsaturated chain.

12. A sprayable composition as claimed in claim 8, comprising a mixture of fluorinated waxes.

13. A sprayable composition as claimed in claim 8, comprising a mixture of fluorinated solvents.

14. A sprayable composition as claimed in claim 7, wherein said composition is nonflammable.

15. A sprayable composition as claimed in claim 7, wherein said wax is a perfluorinated compound containing a carbon chain of from 12 to 20 carbon atoms.

16. A sprayable composition as claimed in claim 1, wherein said composition is non-toxic and nonflammable.

17. A method for improving the gliding properties of a surface comprising spraying the sprayable composition of claim 1 upon said surface.

18. A method as claimed in claim 17, wherein said surface is a ski sole.

19. A spray can comprising the sprayable composition of claim 1.

20. A sprayable composition as claimed in claim 1, wherein said composition is nonflammable.

21. A spray can comprising the sprayable composition of claim 20.

22. A sprayable composition as claimed in claim 1, wherein said wax is a perfluorinated compound containing a carbon chain of from 12 to 20 carbon atoms.

23. A method for applying a fluorinated wax to a ski sole comprising dissolving at least one fluorinated wax having at least twelve carbon atoms per molecule in a perfluorinated solvent having a boiling point of about 30° C. to about 150° C. to obtain a sprayable composition and spraying said sprayable composition on said ski sole.

24. A method as claimed in claim 23, wherein said at least one perfluorinated solvent is selected from perfluorinated alkanes, perfluorinated alkyl ethers, perfluorotripropylamine, perfluoromethylmorpholine, perfluorocyclohexane, perfluorocyclohexene, perfluorobenzene, and mixtures thereof.

25. A method as claimed in claim 24, wherein said at least one fluorinated wax comprises at least one fluorinated compound having 12 to 20 carbon atoms.

* * * * *

UNITED STATES PATENT AND TRADEMARK OFFICE
CERTIFICATE OF CORRECTION

PATENT NO. : 6,284,715 B1 Page 1 of 1
DATED : September 4, 2001
INVENTOR(S) : Gian Paolo Gambaretto It is certified that error appears in the above-identified patent and that said Letters Patent is hereby corrected as shown below:

<u>Title page,</u>
Item [56], References Cited, insert the following:
-- U.S. PATENT DOCUMENTS

| | | | |
|---|---|---|---|
| 4,076,760 | 02/1978 | Hartwimmer | 260/653.1 |
| 4,529,826 | 07/1985 | Gambaretto | 570/142 |
| 4,724,093 | 02/1988 | Gambaretto | 252/58 |
| 5,202,042 | 04/1993 | Traverso et al. | 252/58 |
| 5,423,994 | 06/1995 | Traverso et al. | 252/58 |
| 5,914,298 | 06/1999 | Karydas | 508/106 |
| 6,121,212 | 09/2000 | Gambaretto | 108/590 |

FOREIGN PATENT DOCUMENTS

| | | | |
|---|---|---|---|
| 403157497A | 07/1991 | Japan | C10M / 11/04 |
| 3925525 | 02/1991 | Germany --. | |

Signed and Sealed this

Thirtieth Day of May, 2006

JON W. DUDAS
*Director of the United States Patent and Trademark Office*